(12) United States Patent　　(10) Patent No.: US 12,617,450 B2

Terrasi et al.　　(45) Date of Patent: May 5, 2026

(54) ASSEMBLY FOR A STEERING SYSTEM OF A VEHICLE

(71) Applicant: DANA ITALIA S.R.L., Arco (IT)

(72) Inventors: Gianluca Terrasi, Arco (IT); Claudio Maffei, Arco (IT); Davide Deimichei, Arco (IT); Parag Mahajan, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 19/193,511

(22) Filed: Apr. 29, 2025

(65) Prior Publication Data

US 2025/0333097 A1　　Oct. 30, 2025

(30) Foreign Application Priority Data

Apr. 30, 2024　(DE) ..................... 20 2024 102 217.3

(51) Int. Cl.
*B21D 53/90*　　(2006.01)
*B60B 35/00*　　(2006.01)
(Continued)

(52) U.S. Cl.
CPC .............. *B62D 3/02* (2013.01); *B21D 53/90* (2013.01); *B60B 35/00* (2013.01); *B60B 35/004* (2013.01);
(Continued)

(58) Field of Classification Search
CPC ..... B60B 35/00; B60B 35/004; B60B 35/006; B60B 35/16; B60B 35/163; B60B 35/166; B60G 1/00; B60G 1/02; B60G 1/04; B60G 2206/01; B60G 2206/31; B60G 2206/82; B60G 2206/8207; B60G 2206/82092; B21D 59/90; B62D 1/16; B62D 1/20; B62D 3/00; B62D 3/02; B62D 3/12; B62D 5/00; B62D 5/001; B62D 5/02; B62D 5/04; B62D 5/0403; B62D 5/06; B62D 7/00; B62D 7/16; B62D 7/20; B62D 7/22; B62D 7/222; B62D 7/224; B62D 7/226; B62D 7/228; B62D 27/00; B62D 27/06; B62D 27/065; F16C 2326/24; F16C 2361/31; F16C 2361/41

(Continued)

(56) References Cited

U.S. PATENT DOCUMENTS

| | | | | | |
|---|---|---|---|---|---|
| 5,490,684 | A | * | 2/1996 | Chapman .............. | B66F 11/048 |
| | | | | | 280/47.11 |
| 2005/0082780 | A1 | * | 4/2005 | Seeds ........................ | B62D 7/18 |
| | | | | | 280/93.512 |

(Continued)

FOREIGN PATENT DOCUMENTS

| | | | | | | |
|---|---|---|---|---|---|---|
| CN | | 110116584 | A | * | 8/2019 | ................ B61F 5/24 |
| DE | | 102019125792 | A1 | * | 3/2021 | ........... B62D 5/0421 |

(Continued)

*Primary Examiner* — Jason D Shanske
*Assistant Examiner* — Daniel M. Keck
(74) *Attorney, Agent, or Firm* — McCoy Russell LLP

(57) ABSTRACT

The present disclosure relates to an assembly for a steering system of a vehicle, the assembly comprising an axle part having a coupling recess, and a steering cylinder having a coupling projection. The coupling projection is received in the coupling recess and an interference fit is formed between the coupling projection and the coupling recess.

16 Claims, 1 Drawing Sheet

(51) Int. Cl.

| | |
|---|---|
| B60B 35/16 | (2006.01) |
| B60G 1/00 | (2006.01) |
| B60G 1/02 | (2006.01) |
| B60G 1/04 | (2006.01) |
| B62D 1/16 | (2006.01) |
| B62D 1/20 | (2006.01) |
| B62D 3/00 | (2006.01) |
| B62D 3/02 | (2006.01) |
| B62D 3/12 | (2006.01) |
| B62D 5/00 | (2006.01) |
| B62D 5/02 | (2006.01) |
| B62D 5/04 | (2006.01) |
| B62D 5/06 | (2006.01) |
| B62D 5/12 | (2006.01) |
| B62D 7/00 | (2006.01) |
| B62D 7/16 | (2006.01) |
| B62D 7/20 | (2006.01) |
| B62D 7/22 | (2006.01) |
| B62D 27/00 | (2006.01) |
| B62D 27/06 | (2006.01) |

(52) U.S. Cl.
CPC ............ B60B 35/006 (2013.01); B60B 35/16
(2013.01); B60B 35/163 (2013.01); B60G 1/00
(2013.01); B60G 1/02 (2013.01); B60G 1/04
(2013.01); B62D 3/00 (2013.01); B62D 3/12
(2013.01); B62D 5/00 (2013.01); B62D 5/001
(2013.01); B62D 5/02 (2013.01); B62D 5/06
(2013.01); B62D 7/22 (2013.01); B62D 7/224
(2013.01); B62D 7/226 (2013.01); **B62D
7/228 (2013.01); B62D 27/06** (2013.01);
B62D 27/065 (2013.01); *B60B 35/166*
(2013.01); *B60G 2206/01* (2013.01); *B60G
2206/31* (2013.01); *B60G 2206/82* (2013.01);
*B60G 2206/8207* (2013.01); *B60G 2206/82092*
(2013.01); *B62D 1/16* (2013.01); *B62D 1/20*
(2013.01); *B62D 5/04* (2013.01); *B62D 5/0403*
(2013.01); *B62D 7/00* (2013.01); *B62D 7/16*
(2013.01); *B62D 7/20* (2013.01); *B62D 7/222*
(2013.01); *B62D 27/00* (2013.01); *F16C
2326/24* (2013.01); *F16C 2361/31* (2013.01);
*F16C 2361/41* (2013.01)

(58) Field of Classification Search
USPC ............................ 280/79.11, 79.3, 79.7, 771
See application file for complete search history.

(56) References Cited

U.S. PATENT DOCUMENTS

| | | | | |
|---|---|---|---|---|
| 2017/0369097 | A1* | 12/2017 | Umemoto | ................ B60G 9/02 |
| 2021/0380192 | A1* | 12/2021 | Demond | ................. B62H 1/08 |

FOREIGN PATENT DOCUMENTS

| | | | | |
|---|---|---|---|---|
| EP | 911203 | A2 * | 4/1999 | |
| KR | 20230134902 | A * | 9/2023 | ........... B62D 15/021 |
| WO | WO-2015046499 | A1 * | 4/2015 | ............... B62D 7/10 |

* cited by examiner

ASSEMBLY FOR A STEERING SYSTEM OF A VEHICLE

CROSS REFERENCE TO RELATED APPLICATION

This application claims priority to German Utility Model Application No. 20 2024 102 217.3, entitled "ASSEMBLY FOR A STEERING SYSTEM OF A VEHICLE", filed Apr. 30, 2024. The entire contents of the above-identified application is hereby incorporated by reference for all purposes.

TECHNICAL FIELD

The present disclosure relates to an assembly for a hydraulic steering system of a vehicle, for example a hydraulic steering system. The vehicle may be a road vehicle, such as a car or a bus. For example, the steering system may be configured to steer wheels of the vehicle that are attached to a common axle of the vehicle, such as to a front or rear axle.

BACKGROUND AND SUMMARY

Steering systems that comprise a steering cylinder to steer wheels of a vehicle are known. The steering cylinders are typically fluidically driven, e.g. pneumatically or hydraulically, and convert a hydraulic pressure or pneumatic force into linear motion. This linear motion is e.g. transmitted to a steering linkage or rack-and-pinion mechanism that is connected to one or more wheels of the vehicle. Steering cylinders may comprise a main part, such as a cylindrical barrel or cartridge, and at least one displaceable part, such as a rod that is coupled to e.g. a steering linkage, a steering knuckle or a rack-and-pinion mechanism. The cylinder barrel and piston may jointly confine a fluid chamber whose volume is adjustable depending on generated fluid pressure.

The above-discussed aspects of known steering cylinders may also apply to a steering cylinder as disclosed herein.

To securely transmit the generated linear motion or, put differently, the steering forces causing said linear motion, steering cylinders are typically fixed to adjacent parts of the vehicle. It has been determined by the inventors that existing solutions for achieving said fixation are disadvantageous. For example, they may require comprehensive design adjustments of the steering cylinder and/or the surrounding part. The resulting designs may be limited to only a certain pairing between a steering cylinder and a surrounding part. For example, the surrounding part often has to be specifically adjusted for each variant of steering cylinder in order to be secured thereto. Moreover, existing solutions may require a large number of additional parts, such as screws, and/or an increased time for assembling the overall steering assembly.

It is therefore an object of this disclosure to alleviate at least some of the existing disadvantages.

Accordingly, the present disclosure suggests an assembly for a steering system of a vehicle, the assembly comprising:
    an axle part having a coupling recess, and
    a steering cylinder having a coupling projection;
    wherein the coupling projection is received in the coupling recess and an interference fit is formed therebetween, i.e. between the coupling projection and the coupling recess.

The steering cylinder may be fluidically driven, for example it may be driven hydraulically or pneumatically. It may be an elongated member, wherein a longitudinal axis may coincide with or extend in parallel to a first axis disclosed herein along which steering forces can be generated. At least sections of the steering cylinder may have a rounded cross-section, for example a circular cross-section. The steering cylinder, for example a main part or a main housing thereof, may have oppositely facing ends, e.g. when viewed along its longitudinal axis. At each end, at least part of a movable piston or rod of the steering cylinder may be positioned. In a generally known member, further parts, such as mechanical links, may be connectable to said piston or rod to transfer the steering forces to steerable wheels of the vehicle. In one example, the steering cylinder may be configured to move the piston or rod at each of its ends linearly along the longitudinal axis and/or below-discussed first axis.

Generally, the steering cylinder may be configured to steer two wheels of the vehicles. It may be positioned in between said two wheels, for example at a substantially equal distance to each of said two wheels.

The coupling projection may e.g. project from and/or project relative to at least one of a housing, a main part or a circumferential outer face of the steering cylinder. For example, it may project from said housing, main part of circumferential outer face towards the axle part and thus away from a longitudinal axis and/or the below-discussed first axis.

The axle part may be stationary. As detailed below, it may comprise a housing that houses and/or connects to further axle components. For example, the axle part may house at least part of a gear set such as a differential of a driven axle of the vehicle.

The interference fit may be configured to reliably secure the steering cylinder to the axle part, e.g. even in view of expected operational forces such as steering forces. For example, sizes of surfaces of the coupling projection and coupling recess that contact each other and/or tolerances between said contacting surfaces may be adjusted accordingly. As a result, the interference fit may generate sufficiently large clamping forces. Put differently, the interference fit may define a fixed bearing or counter-bearing of the steering cylinder on (or at) the axle part, allowing the steering cylinder to support itself against the housing and/or to immovably rest against the housing when generating the steering forces. Specifically, the steering cylinder may be non-movably held at and non-movably held relative to the axle part by way of the interference fit.

The interference fit may include a form fit between the coupling recess and coupling projection. Accordingly, the coupling recess and coupling projection may be complementary shaped, at least in sections.

In one embodiment, the assembly further comprises at least one screw connection that connects the coupling projection and coupling recess. For example, the screw connection may force the coupling projection and the coupling recess against each other, for example. The screw connection may at least generate part of the clamping forces necessary to reliably secure the steering cylinder to the axle part. In such a case, the interference fit may be designed to less firmly secure the coupling projection and coupling recess to one another compared to designs in which no respective screw connection is present. Additionally or alternatively, the screw connection may serve as a redundant means of securing the coupling projection and coupling recess to one another.

Generally, the steering cylinder may be configured to generate steering forces along a first axis which may be a longitudinal axis of the steering cylinder, for example.

In one embodiment, the interference fit is configured to obstruct a relative movement between the coupling recess and the coupling projection along said first axis. Put differently, the coupling recess and coupling projection may be hindered from sliding relative to another. Additionally or alternatively, the interference fit may obstruct a movement along any axis extending orthogonally to the steering axis. This may suppress the coupling projection and coupling recess from being pulled away from one another and/or from being lifted off of one another. Generally, the interference fit may be configured to suppress any relative movement between the coupling recess and coupling projection.

For example, in another embodiment, the interference fit is configured to obstruct a relative rotation about a second axis, wherein the second axis may extend in a plane extending orthogonally to the first axis.

According to further embodiment, the steering cylinder comprises a main cylinder part to which the coupling projection is welded or otherwise connected. The main cylinder part may e.g. comprise or house a fluid chamber in which a pressurized fluid for generating steering forces can be received. The main cylinder part may at least partially have a rounded or circular cross-section. It may be or comprise a barrel. It may be a single-part member or a multi-part assembly. The main cylinder part may at least in sections contact the axle part. The axle part may have a contact surface that is correspondingly shaped, for example correspondingly rounded, compared to a section of the surface of the main cylinder part which contacts said contact surface.

Generally, the axle part may not enclose or surround the steering cylinder and/or the main cylinder part, e.g. by circumferentially enclosing or circumferentially surrounding at least a section thereof. Accordingly, the steering cylinder and/or the main cylinder part may not be inserted into and/or inserted through openings or through holes of the axle part.

The coupling projection may be configured to project from and/or relative to an outer circumferential surface of the steering cylinder.

The at least one optional screw connection may comprise a screw, a threaded hole for receiving a threaded shaft of the screw and a bearing surface for a screw head of the screw. The threaded hole may be formed in only one of the axle part and steering cylinder, for example in only one of the coupling recess and the coupling projection. Alternatively, each of the axle part and steering cylinder, for example each of the coupling recess and the coupling projection, may comprise a section of the threaded hole. For example, the coupling recess may comprise a first section of the threaded hole, whereas the coupling projection may comprise a second section of the threaded hole, wherein the first section and the second section may be aligned with one another to form a continuous and/or elongated threaded hole that is configured to receive the screw.

Accordingly, at least a part of the threaded hole may be comprised by the axle part, for example by its coupling recess. Additionally or alternatively, the bearing surface may be comprised by the steering cylinder, for example by its coupling projection.

According to further embodiment, the steering cylinder is configured to generate steering forces along a first axis and the at least one screw extends at an angle to said first axis. For example, the screw may extend perpendicular to said first axis and/or in such a manner, so that they are not aligned with an axis of the steering forces. On the other hand, a contact area between the coupling recess and coupling projection that are e.g. forced against one another by way of the screw connection may extend in parallel to said first axis.

According to a further example, the axle part is a housing part of an axle component. for example, the housing part may be configured to receive at least part of a differential or of another axle component.

In one embodiment, the coupling recess is formed as a locally recessed area on an outwardly facing surface of the axle part. The outwardly facing surface may be accessible from outside, e.g. so that the coupling projection can be brought into engagement therewith to form the interference fit.

The locally recessed area may have a bottom surface that is e.g. recessed with respect to surrounding outer surfaces of the axle part. The locally recessed area may have side faces connecting said bottom surface to the surrounding outer surfaces. Generally, the locally recessed area may have at least one opened side face. Specifically, said opened side face may be arranged and/or oriented, so that the coupling projection can be inserted into the coupling recess through or alongside said opened side face and/or may extend out of the coupling recess through said opened side face.

In one example, the coupling projection is configured to project from and/or relative to an outer circumferential surface of the steering cylinder, for example from and/or relative to a main part of said steering cylinder.

In another example, there are at least two screw connections for forcing the coupling recess and coupling projection against one another, for example for directly connecting them to one another. In the latter case, both screw connections may extend through and/or may at least partially be received in the coupling projection and coupling recess.

The present disclosure also concerns an axle part and a steering cylinder for configuring an assembly according to any of the examples disclosed herein. For example, the axle part may comprise a coupling recess having any of the features disclosed herein. Similarly, the steering cylinder may comprise a coupling projection having any of the features disclosed herein.

Exemplary embodiments according to the present disclosure are discussed below with reference to the schematic figures.

DETAILED DESCRIPTION

Figure 1:
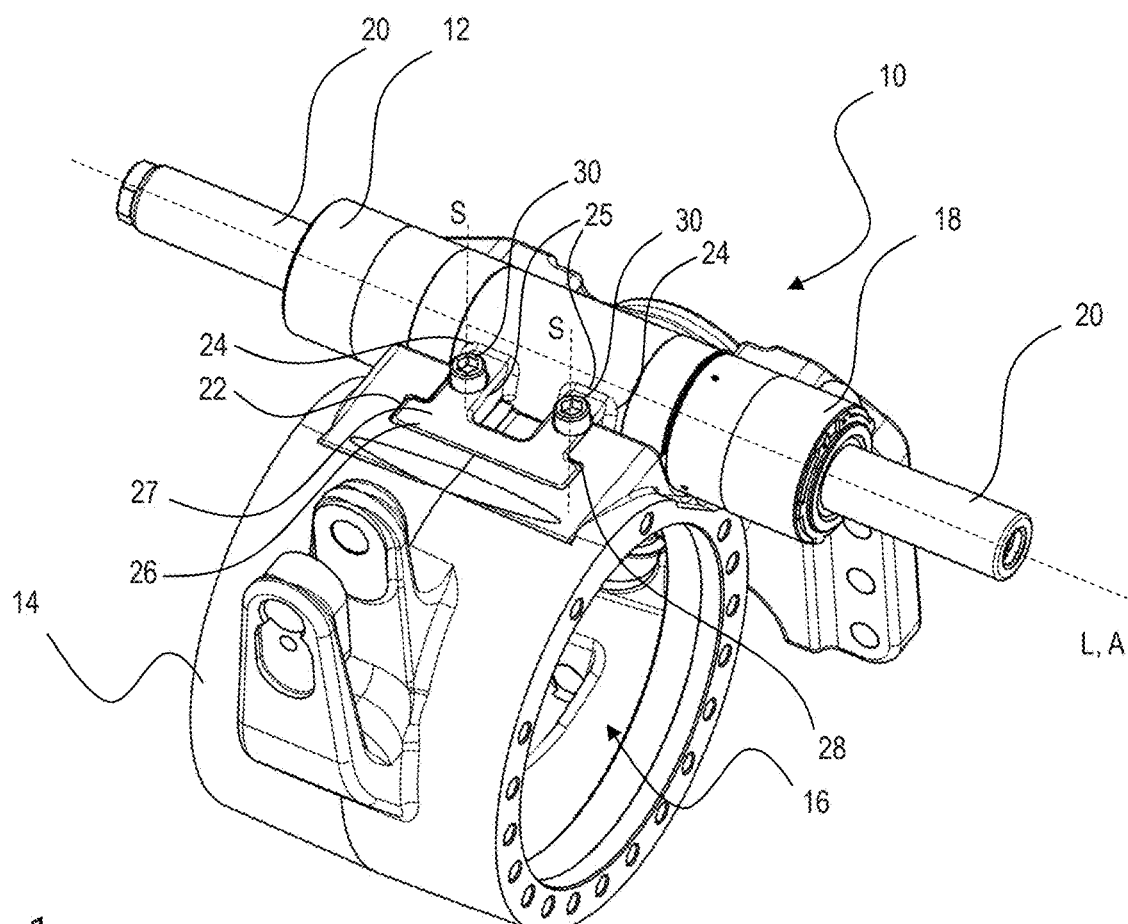
FIG. 1 shows a perspective view of an assembly according to a first embodiment.

FIG. 1 shows a perspective view of an assembly 10 for configuring a driven and steerable vehicle axle. The assembly 10 is configured according to an exemplary first embodiment. The assembly 10 comprises a steering cylinder 12 and an axle part 14. The axle part 14 is a housing which is also often referred to as a central housing. The axle part 14 comprises an inner space 16 for receiving at least part of a differential. The axle part 14 is connected to further non-illustrated axle components.

The steering cylinder 12 comprises a main part 18 that may also be referred to as a main housing. The main part 18 encloses a non-illustrated fluid chamber for receiving a pressurized fluid, such as hydraulic oil. The main part 18 extends along a longitudinal axis L which coincides with a first axis A according to this disclosure. The main part 18 has a substantially circular cross-sectional shape e.g. when viewed in a cross-sectional plane extending orthogonally to the axes L, A. Put differently, the main part 18 has a substantially circular circumference e.g. extending about said axes L, A. Further, the main part 18 is generally cylindrical and/or barrel-shaped.

At oppositely facing axial outer ends of the main part 18, parts of pistons 20 extend axially outward. These pistons 20 are axially movable in accordance with a pressure that is generated within the non-illustrated fluid chamber inside of the main part 18. The pistons 20 are each coupled to further components of a steering linkage and specifically to a steerable wheel of the vehicle. In a generally known manner, the axial movement of the pistons 20 may be converted into a steering movement of said vehicle wheels, wherein said vehicle wheels are comprised by and/or form a common axle of the vehicle. The movement of the pistons 20 is generated by a steering force that extends along the first axis A.

A coupling projection 22 extends from the main part 18 and towards the axle part 14, so as to overlap therewith. The coupling projection 22 is welded to the main part 18 or may alternatively be integrally formed therewith. The coupling projection 22 is formed as a solid or massive block which, in the shown example, has a double T-shape. The T's of said shape are arranged next to one another and their top strokes merge with one another. Alternatively, this may be described as a Pi-shape which resembles the Greek letter Pi ($\pi$). Accordingly, the coupling projection has two projecting sections 25 that are connected by a cross section 27.

By way of the non-limiting depicted shape, relative movements, for example axial movements and rotations about a non-depicted axis extending vertically and orthogonally to the depicted axis L, A, may be suppressed. However, other shapes of the coupling recess 28 and coupling projection 20 are equally possible to achieve similar movement restrictions.

The coupling projection 22 projects away from the axes L, A. Accordingly, first ends 24 thereof that are connected to and/or merge with the main part 18 are closer to said axes L, A compared to a free end 26 of the coupling projection 22 that faces away from the main part 18. Accordingly, the coupling projection 22 may be described as projecting radially with respect to the axes L, A.

On an outwardly facing surface and overlapping with the coupling portion 22, the axle part 14 comprises a coupling recess 28. The coupling recess 28 is formed as a locally recessed area or local indentation in said outwardly facing surface. The coupling recess 28 has an outline that is complementary shaped to the exemplary double T- or Pi-shaped outline of the coupling projection 22. The outline of the coupling recess 28 is open to one side (see the side face 37 in FIG. 2), said side facing the steering cylinder 12, for example its main part 18. The coupling projection 22 extends along or through said open side, while remaining flush with or below of the outwardly facing surface of the axle part 14, for example.

In the shown example, outlines of the coupling recess 28 and coupling projection 22 may be considered that result from being (e.g. orthogonally) projected into a virtual spatial plane that comprises the axes L, A or extends in parallel thereto.

The dimensions of the coupling recess 28 and of the coupling projection 22 are defined so that not only a form fit is formed therebetween, but also an interference fit. This interference fit, i.e. press fit, is sufficiently strong to generate at least a significant share of, if not the entire forces necessary to reliably secure the steering cylinder 12 to the axle part 14. This also includes prohibiting relative movements between these parts when generating the steering forces and/or while experiencing any other forces during operation of the vehicle.

From FIG. 1, it can also be seen that the steering cylinder 12, for example the main part 18, is not enclosed by the axle part 14 or inserted into any openings thereof, e.g. for centering purposes and/or for forming a mechanical connection. Rather, the steering cylinder 12 is placed adjacent to the axle part 14 and contacts it in defined sections (see the discussion of FIG. 2 below). This simplifies assembly and especially the design of the axle part 14. It also enables a fast assembly of the steering cylinder 12 to the axle part 14 which includes generating the interference fit between these members.

As an optional feature, the steering cylinder 12 and axle part 14 are also secured to one another by at least one screw connection 30. In the shown example two screw connections 30 are present. These extend within and directly connect the coupling projection 22 and coupling recess 28 to one another. Specifically, a screw connection 30 is arranged in the area of and extending through each of the projecting sections 25 of the coupling projection 22. Each screw connection 30 is configured to clamp or, in other words, force the coupling projection 20 and coupling recess 28 to one another to generate additional forces for securing the main cylinder 12 to the axle part 14. This may lower the required extent of clamping forces that are to be generated by the interference fit between the coupling projection 20 and the coupling recess 28.

Figure 2:
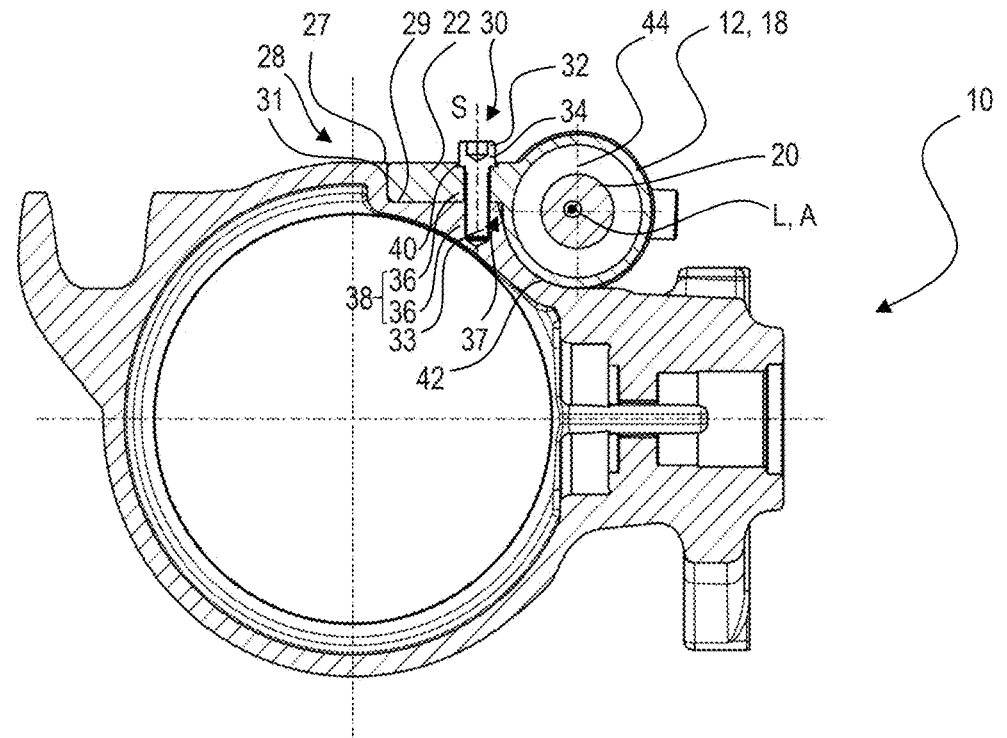
FIG. 2 shows a sectional view of the assembly according to the first embodiment.

FIG. 2 shows a cross-sectional view of the assembly 10 of FIG. 1. The cross-sectional plane extends orthogonally to the axes L, A and along a screw 32 of one of the screw connections 30. Accordingly, it can be seen that the screw 32 extends through the coupling projection 20 and into the coupling recess 22. Specifically, it extends into a massive volume of the axle part 14, said volume comprising a bottom surface 29 of said coupling recess 28.

In more detail, both of the coupling projection 22 and the coupling recess 28 comprise a threaded hole section 36 which at least in the coupling projection 22 is formed as a through-hole. The threaded hole sections 36 are aligned to jointly form a threaded hole 38 of the screw connection 34 which receives a threaded screw shaft 33. An outwardly facing surface of the coupling projection 22 also comprises a bearing surface 44 for a screw head 34 of the screw 32. By way of example, the bearing surface 44 is formed as a countersink or, put differently, in a countersink shape.

From FIG. 2, but also from FIG. 1 it also becomes apparent that the screws 32 are oriented at an angle to the axes L, A, wherein said orientation is defined by an orientation of a longitudinal axis S of each screw 32. In more detail, these longitudinal screw axes S extend in a plane which itself extends orthogonally to the axes L, A. Further, the longitudinal axis S of each screw 32 is oriented substantially orthogonally to the axes L, A and/or may orthogonally intersect a non-illustrated virtual axis extending in parallel to the axes L, A. The axes S are examples of second axes about which the interference fit suppresses a relative rotation between the coupling recess 28 and coupling projection 22.

As a result, the screws 32 are not subjected to steering forces along their respective axes S. Rather, these forces are largely compensated for or, put differently, are absorbed by way of the interference fit between the coupling recess 28 and coupling projection 22. This means that the screws 32 can be reduced in number and/or size and/or that the overall connection between the steering cylinder 12 and an axle part 14 is more reliable. For example, this may apply compared to a scenario in which the screws 32 are oriented along the axes L, A, thereby being subjected to the steering forces in their axial directions.

The screws 32 nevertheless help to prevent a lifting off of the coupling projection 20 from the coupling recess 28 e.g. in the vertical direction of FIG. 1. Additionally or alternatively, they provide at least an indirect resistance against steering forces by increasing frictional forces between the coupling projection 20 and coupling recess 28.

Further, in the example depicted here, the screws 32 are oriented so that their screw heads 34 face outwardly such as vertically outwardly or upwardly, e.g. when the assembly 10 is positioned as shown in FIG. 1. The screw heads 34 are thus easily accessible for tightening and/or releasing them.

Moreover, due to using two screws 32, a required surface quality of, for example, the bottom surface 29 of the coupling recess 28 can be reduced. For example, a lack of planarity can at least partially be compensated for when generating clamping forces by the respectively spaced apart plural screws 32.

From FIG. 2, also the following becomes apparent: The axle part 14 comprises a concavely curved outer surface section 42 which contacts a correspondingly curved section of the main part 18 of the steering cylinder 12. Further, a part of the interior fluid chamber 44 inside the main cylinder 12 can be seen as well as a cross-section of one of the rods 20 that is located inside said fluid chamber 44.

Further, it can be seen that the coupling projection 22 has a substantially flat lower surface resting against the bottom surface 29 of the coupling recess 28. Moreover, its free end section 27 and specifically an outwardly facing surface thereof is in directly facing contact with a side face 31 of the coupling recess 28. Opposite to said side surface 31, the coupling recess 28 is opened or, put differently, non-bounded. Accordingly, the coupling projection 22 can extend into the coupling recess 28 through said respectively opened side face 37.

The side surface 31 along with adjacent side surfaces which contact the coupling projection 22 may be specifically machined fitting surfaces to generate the disclosed interference fit between the steering cylinder 12 and axle part 14.

In the shown example, the axle part 14 can be relatively compact e.g. because no dedicated brackets, through holes or insertion sections are formed thereat to receive and at least partially surround the steering cylinder 12. This means that the size and weight of the axle part 14 can be reduced. Also, this may enable that an outer surface area for contacting the steering cylinder 12 and that needs to be specifically machined becomes smaller. Further, this may increase compatibility of the axle part 14 to a larger number of differently configured and/or differently sized steering cylinders 12, for example when said steering cylinders 12 comprise similarly sized and shaped coupling projections 20. In such cases, it may be sufficient to adjust a radius and/or shape of the rather compact contact surface 42 of the axle part 14.

FIGS. 1-2 are shown approximately to scale. FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact.

As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. An assembly for a steering system of a vehicle, the assembly comprising:
   an axle part having a coupling recess; and
   a steering cylinder having a coupling projection;
   wherein the coupling projection is received in the coupling recess and an interference fit is formed therebetween;
   further comprising at least one screw connection that forces the coupling projection and coupling recess against each other;
   wherein the at least one screw connection comprises a screw, a threaded hole for receiving a threaded shaft of the screw and a bearing surface for a screw head of the screw; and
   wherein at least a part of the threaded hole is comprised by the coupling recess of the axle part, and wherein the bearing surface is comprised by the coupling projection of the steering cylinder.

2. The assembly of claim 1, wherein the steering cylinder is configured to generate steering forces along a first axis, wherein the interference fit is configured to obstruct a relative movement between the coupling recess and coupling projection along said first axis.

3. The assembly of claim 1, wherein the steering cylinder is configured to generate steering forces along a first axis, wherein the interference fit is configured to obstruct a relative rotation about a second axis.

4. The assembly of claim 3, wherein the second axis extends in a plane extending orthogonally to the first axis.

5. The assembly of claim 1, wherein the steering cylinder comprises a main cylinder part, wherein the coupling projection is welded or otherwise connected to the main cylinder part.

6. The assembly of claim 5, wherein the coupling projection is configured to project from and/or relative to an outer circumferential surface of the main cylinder part.

7. The assembly of claim 1, wherein the steering cylinder is configured to generate steering forces along a first axis and the screw extends at an angle to said first axis.

8. The assembly of claim 1, wherein the axle part is a housing part.

9. The assembly of claim 8, wherein the housing part is configured to receive at least part of a differential or of another axle component.

10. The assembly of claim 1, wherein the coupling recess is formed as a locally recessed area on an outwardly facing surface of the axle part.

11. The assembly of claim 10, wherein the locally recessed area has at least one opened side face.

12. A steering cylinder comprising a coupling projection for configuring the assembly of claim 1.

13. An axle part comprising a coupling recess for configuring the assembly of claim 1.

14. An assembly for a steering system of a vehicle, the assembly comprising:

an axle part having a coupling recess, wherein the coupling recess is a locally recessed area on an outwardly facing surface of the axle part; and a steering cylinder having a coupling projection, wherein the coupling projection comprises a first projecting section and a second projecting section each projecting radially from the steering cylinder, and a cross section extending perpendicularly to the first projecting section and the second projection section, the cross section connecting the first projecting section and the second projecting section;

wherein the coupling recess of the axle part is complementary shaped to the coupling projection; and wherein the coupling projection is received in the coupling recess and an interference fit is formed therebetween.

15. The assembly of claim 14, wherein the first projecting section, the second projecting section, and the cross section form a double T-shape.

16. An assembly for a steering system of a vehicle, the assembly comprising:

an axle part comprising an inner surface delimiting an inner space for receiving at least part of a differential, and an outer surface opposite the inner surface, wherein the outer surface comprises a coupling recess, wherein the coupling recess is a locally recessed area on the outer surface of the axle part; and a steering cylinder having a coupling projection, wherein the coupling projection of the steering cylinder is complementary shaped to the coupling recess of the axle part;

wherein the coupling projection is received in the coupling recess and an interference fit is formed therebetween;

wherein the coupling recess adjoins a concavely curved surface section of the outer surface which contacts a correspondingly curved section of the steering cylinder;

wherein the coupling projection of the steering cylinder, received in the coupling recess, is flush with or below the outer surface of the axle part; and wherein the steering cylinder is not enclosed by the axle part or inserted into any openings thereof.

* * * * *